M. SPAZIER.
PROCESS FOR PRODUCING SODIUM CARBONATE.
APPLICATION FILED JUNE 23, 1913.

Patented Dec. 29, 1914.

Witnesses,

Inventor,
Morris Spazier,
Attorneys.

UNITED STATES PATENT OFFICE.

MORRIS SPAZIER, OF LOS ANGELES, CALIFORNIA.

PROCESS FOR PRODUCING SODIUM CARBONATE.

1,122,323.   Specification of Letters Patent.   Patented Dec. 29, 1914.

Application filed June 23, 1913. Serial No. 775,233.

*To all whom it may concern:*

Be it known that I, MORRIS SPAZIER, a citizen of the United States, residing at Los Angeles, in the county of Los Angeles and State of California, have invented new and useful Improvements in Processes for Producing Sodium Carbonate, of which the following is a specification.

This invention relates to processes for producing sodium carbonate, and the principal object is to provide a process of crystallizing sodium carbonate by simple and inexpensive means.

It is also an object to provide a process for forming sodium carbonate without the application of heat.

It is a further object to provide a process for producing sodium carbonate from crude soda ash solely by the use of water.

Figure 1:
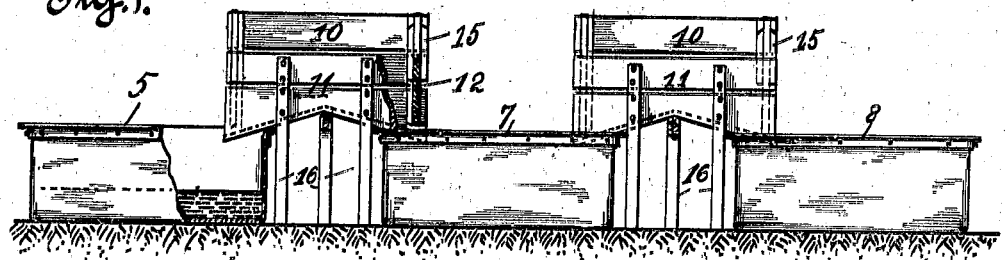
Figure 2:
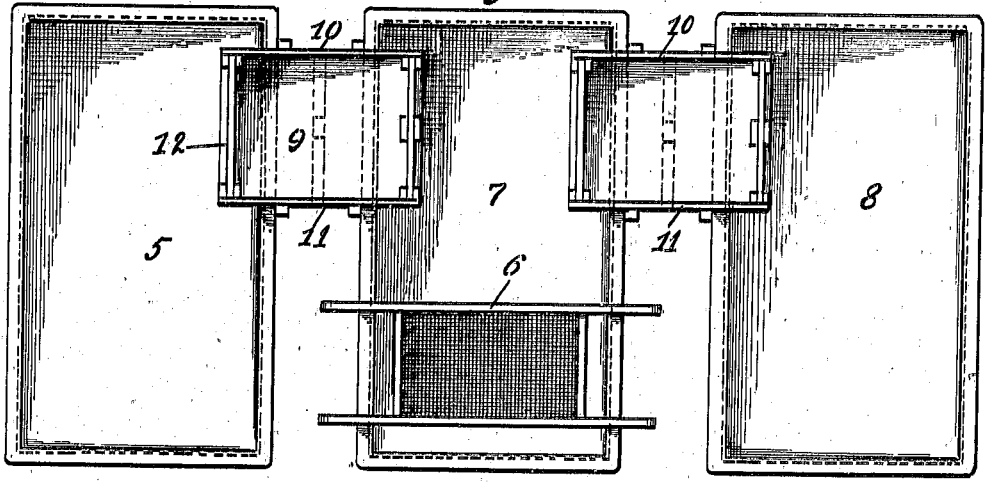
Figure 3:
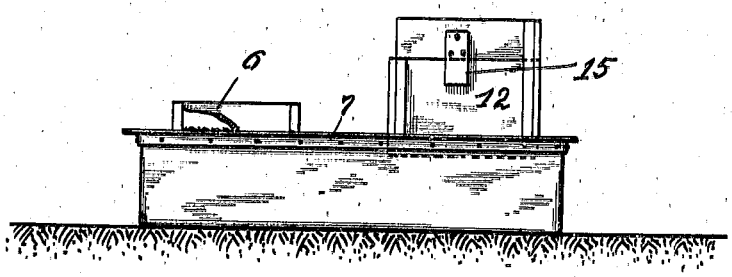

In the drawings accompanying this specification and showing a typical plant for performing the process: Figure 1 is an end elevation of the tanks and drain boards. Fig. 2 is a plan view of the apparatus showing the screening device. Fig. 3 is a side elevation of the tanks and drain boards.

Heretofore in the production of washing soda or sodium carbonate the processes have been expensive, as well as consuming long periods of time, together with the application of heat to complete a somewhat unsatisfactory method.

This invention aims to overcome the above difficulties by providing a simple apparatus, as well as a simple method of forming crystallized soda with the least expenditure of time, labor, and apparatus.

More specifically, the process consists of introducing into the tank 5 the amount of cold water, approximately one hundred and eighty gallons, the tank being filled about one-third of its height by this amount of water. By cold water is meant water of the temperature at which it is drawn from the water mains of municipalities. To this amount of water approximately six hundred pounds of soda ash are added, being preferably screened through the screen 6, at the same time being manually agitated, the mesh of the screen being preferably about three-eighths of an inch square so that the ash is thoroughly broken up, the agitation assisting in dissolving the crude material introduced. When the entire amount of soda ash has been screened in the tank the operator preferably enters the same and walks around the entire area breaking up the lumps that have not been fully dissolved, the result being a clean milky solution. Upon the completion of this stage the solution is left alone and, if desired, the successive tanks 7 and 8 may be filled, or any number, as desired, it being preferably arranged so that only one tankful is formed each day. After an hour's interval the solution is examined and if any sediment is found the latter is stirred and agitated again for a few minutes. The solution is now left for seventy hours open to the air and within a few hours a film of soda appears upon the surface of the solution and the crystals will start building from the under surface of this film and then fall to the bottom until the entire amount equal to about fifty-eight per cent. of the crude soda ash has been crystallized. At the end of the seventy hour period one corner of the film is broken and the water remaining is siphoned or transferred to another tank to assist in the cyclic process. The entire amount of crystallized sal soda is now removed to the drain board 9, this drain board being preferably provided with a back 10 of approximately twice the height of the front 11, with movable end boards 12, and an auxiliary end board 14 secured by means of the strips 15 over the lower board 12. Suitable supports 16 hold these drain boards intermediate of a pair of tanks, the tanks being preferably supported about three feet so that the operator has easy access to the drain boards, the material composing these drain boards being preferably separated to form draining openings so that the fluid drained therefrom drains back into the tanks. The crystals are allowed to remain four or five hours upon the drain board, when it is sacked direct from the board into suitable sacks usually containing about one hundred pounds and depending upon the character and percentage of carbonate found within the solution, sixteen and sometimes twenty of these sacks will be obtained from one solution. With the liquor drained from the first tank applied to the second tank, together with about one hundred and forty gallons of water, the operation above described is again repeated by screening within this latter amount of water and liquid the six hundred pounds of soda ash, and the other steps are carried through until the required time has passed when the liquid remaining may be transferred to tank 8, and upon completion of the process therein the liquor is transferred to tank 5, forming a cyclic process with the production of a full working capacity of one tank every day.

By previous processes a poor quality has been obtained, the time required amounting to approximately twelve days, the product being cloudy and formed of a solid mass difficult to break and requiring the use of picks to remove it from the tanks and of crushers to bring it to a marketable size, while by this process the soda produced is clear and granulated, one-fourth of the time mentioned above being consumed.

What I claim is:

1. A process for forming sodium carbonate crystals consisting in mixing soda ash in cold water, agitating the mixture in a manner to prevent the formation of lumps and until a complete solution is obtained, allowing the solution to stand for a predetermined period, and withdrawing the crystallized product.

2. A process for producing sodium carbonate crystals comprising the mixing of screened soda ash and water in an open tank, agitating the mixture during the mixing process in a manner adapted to prevent the formation of lumps, and to obtain a complete solution, exposing the solution to the action of the air for a predetermined period, withdrawing the liquor present, and finally removing the crystallized product to suitable drainage apparatus.

3. A process for producing sodium carbonate crystals comprising the mixing of screened soda ash and water in an open tank, agitating the mixture during the mixing process in a manner adapted to prevent the formation of lumps and to obtain a complete solution, exposing the solution to the air for a period of seventy hours, and withdrawing the crystallized product.

In witness that I claim the foregoing I have hereunto subscribed my name this 13th day of June, 1913.

MORRIS SPAZIER.

Witnesses:
 EDMUND A. STRAUSE,
 MARIE BATTEY.